UNITED STATES PATENT OFFICE.

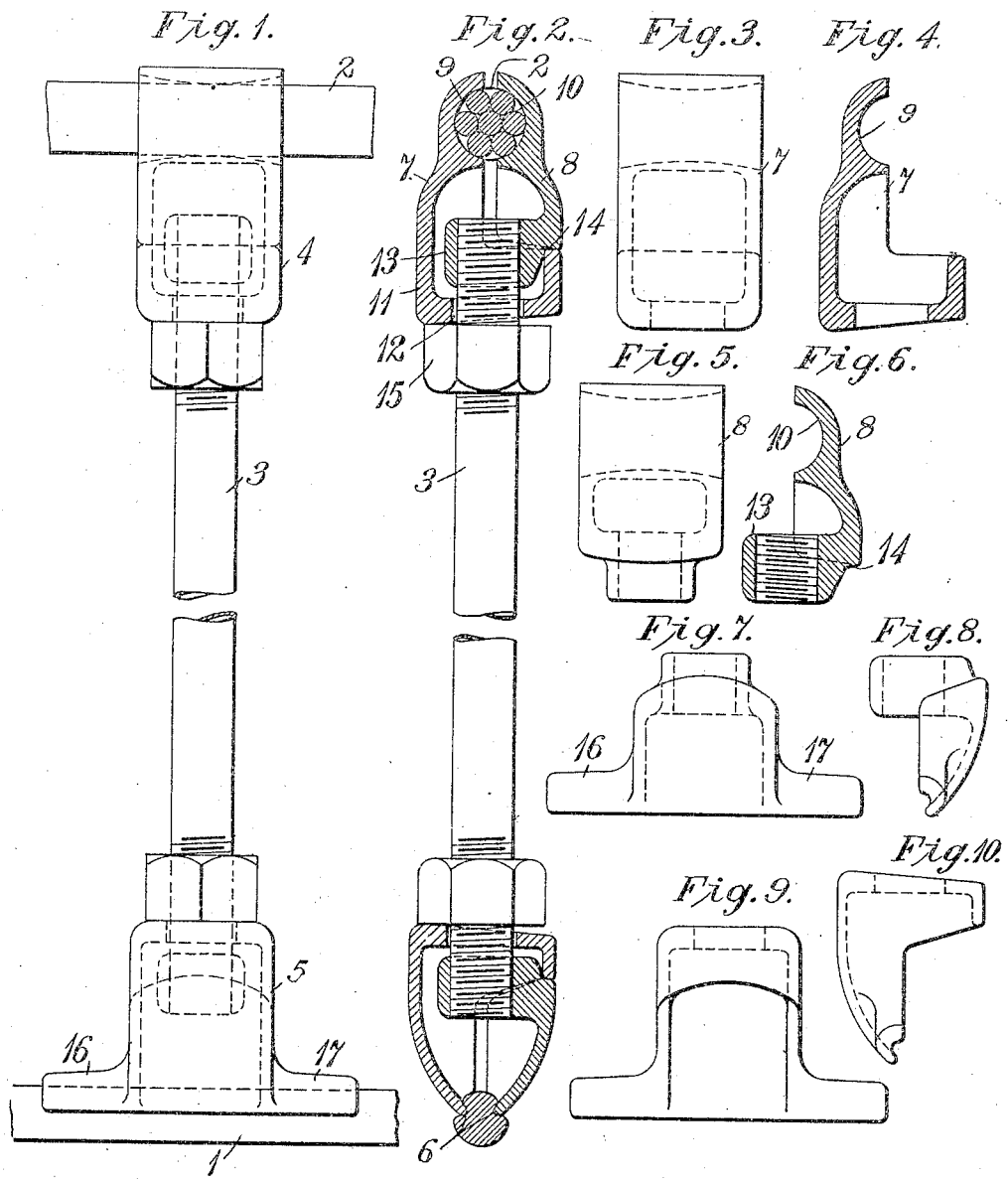
C. AALBORG.
HANGER AND CLAMP FOR WIRES AND CABLES.
APPLICATION FILED SEPT. 9, 1907.
931,367.
Patented Aug. 17, 1909.

CHRISTIAN AALBORG, OF WILKINSBURG, PENNSYLVANIA, ASSIGNOR TO WESTINGHOUSE ELECTRIC & MANUFACTURING COMPANY, A CORPORATION OF PENNSYLVANIA.

HANGER AND CLAMP FOR WIRES AND CABLES.

No. 931,387.     Specification of Letters Patent.     Patented Aug. 17, 1909.

Application filed September 9, 1907. Serial No. 392,047.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Hangers and Clamps for Wires and Cables, of which the following is a specification.

My invention relates to means for supporting electric line conductors and it has for its object to provide an improved clamping device whereby a trolley conductor may be simply and durably secured to a suitable support.

My improved clamping device is specially adapted for use with grooved trolley conductors that are suspended from messenger wires or cables but its use is not limited in this regard and it may be employed in connection with conductors of circular cross section that are supported from bracket arms or cross wires, in accordance with a well known practice for low potential lines.

Figure 1, of the accompanying drawings, is a front elevation and Fig. 2 is an end elevation of a trolley hanger and clamp constructed in accordance with my invention. Figs. 3, 4, 5, 6, 7, 8, 9 and 10 are detail views of the clamps shown in Figs. 1 and 2.

Referring to the drawings, a trolley conductor 1 is suspended from a messenger wire or cable 2 by means of a hanger rod 3, a cable clamp 4 and a trolley clamp 5. The cable clamp 4 and the trolley clamp 5 are substantially alike except that the trolley clamp is provided with hook projections that are adapted to engage the grooves 6 in the trolley conductor 1 while the cable clamp 4 is provided with the grooves which are adapted to receive the cable 2, consequently only one of these parts will be described in detail.

The cable clamp 4 comprises two parts 7 and 8 having complementary grooves 9 and 10 that are adapted to receive the cable 2. The member 7 comprises a hollow sleeve 11 which is partially closed at one end, being provided with an opening 12 through which the extremity of the rod 3 may extend. The member 8 is similar to the member 7 close to the cable 2 but its other extremity is provided with an inwardly extending projection 13 which is screw-threaded to receive the extremity of the rod 3. The outer surface of the member 7, adjacent to the opening 12, is beveled relative to the center line of the opening, and the projection 13, which extends from the member 8, is provided with a shoulder 14 against which one edge of the sleeve 11 may rest. In assembling the clamp, a set nut 15 is screwed onto the extremity of rod 3 which is then thrust through the opening 12 and is screwed into the tapped hole in the projection 13. The nut 15 is then forced toward the end of the rod and against the beveled surface of the member 7, thereby producing a clamping action between the two parts.

The trolley clamp 5 is similar to the cable clamp 4, except that it is provided with lateral projections 16 and 17 which are adapted to engage the groove 6 in the trolley conductor 1. The details of construction of the clamps 4 and 5 may best be understood by reference to Figs. 3 to 10, inclusive, in which the portions of the clamps are designated by the same reference characters as those employed in Figs. 1 and 2.

It will be observed that a considerable adjustment in the length of the hanger may be effected, since the hanger rod is screw-threaded for a material distance near its ends. Another advantage of my improved hanger lies in the fact that the trolley conductor may be released from its clamp without disturbing the messenger cable clamp.

It is conceivable that variation in the size and arrangement of parts may be effected within the scope of my invention and I desire that only such limitations shall be imposed as are indicated in the appended claims.

I claim as my invention:

1. A clamp for wires or cables comprising a hanger rod, two complementary jaw members having grooves in which a wire or cable may be supported, one of said jaw members having a substantially tubular body portion partially closed at one end to form an opening through which the end of the rod extends and the other member being provided with a tapped sleeve projection which extends into the tubular body of the first member and is engaged by the extremity of the hanger rod and a set-nut which is forced against the outer surface of the partially closed end of the tubular body portion to produce a clamping action between the jaw members.

2. A clamp for wires or cables comprising a hanger rod, two complementary jaw members having hook projections adapted to engage a grooved conductor, one of said members having a substantially tubular body portion partially closed at one end to form an opening through which the end of the rod extends, the other member being provided with a tapped sleeve projection which extends into the body portion of the other member and engages the extremity of the rod, a set nut which engages the hanger rod and is forced against the outer surface of the closed end of the tubular body portion; said surface being beveled to produce a clamping action between the hook projections of the jaw members.

3. A hanger comprising a rod, two complementary jaw members one of which has a hollow body portion and a beveled outer end surface and the other of which has a projection located within said hollow body portion and into which the end of the rod is screwed, and a nut mounted on the rod to engage the beveled end surface.

4. A hanger comprising a rod having a screw-threaded end, a clamping member having a hollow body portion and a beveled outer end surface, a clamping member having a projection located in the said hollow body portion to receive the end of the rod and provided with a shoulder to be engaged by one side of the other member, and a nut mounted on the rod to engage the beveled surface.

5. A hanger comprising a rod having a screw-threaded end, a clamping member having a hollow body portion and a beveled end surface, a clamping member having a laterally projecting lug into which the end of the rod is screwed, and a nut mounted on the rod to engage said beveled end surface to draw the members together.

6. The combination with a support, of a pair of clamping members having transversely extending projections, one of said members being carried on said support by its transversely extending member and the other member being carried on said first member by having substantially the outer end of its transversely extending member resting on the first member, and means engaging said second member opposite its point of support for causing a relative movement between the gripping ends of the two members.

7. The combination with a supporting member, of a pair of clamping members each having a transversely extending member, one of said members being carried by the support and the other carried on the first member and fulcrumed thereon, said transversely extending members each having an opening therein to permit the support to pass therethrough.

In testimony whereof I have hereunto subscribed my name this 29th day of August, 1907.

CHRISTIAN AALBORG.

Witnesses:
FRANK CONRAD,
BIRNEY HINES.